(12) United States Patent
Yuki et al.

(10) Patent No.: US 6,940,699 B2
(45) Date of Patent: Sep. 6, 2005

(54) DISK DRIVE APPARATUS HAVING A PIVOT FOR SUPPORTING A HEAD ASSEMBLY TO ALLOW FREE PIVOTING

(75) Inventors: Toshihiko Yuki, Yamato (JP); Hitoshi Tsujino, Fujisawa (JP); Jun Ishikawa, Yokohama (JP); Naoaki Kanada, Sagamihara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 320 days.

(21) Appl. No.: 10/061,990

(22) Filed: Jan. 31, 2002

(65) Prior Publication Data

US 2002/0114109 A1 Aug. 22, 2002

(30) Foreign Application Priority Data

Feb. 21, 2001 (JP) ........................................ 2001-045715

(51) Int. Cl.⁷ .............................. G11B 21/08; G11B 5/55
(52) U.S. Cl. ..................................................... 360/265.2
(58) Field of Search ........................... 360/265.2, 265.6, 360/264.3, 264.7, 264.1, 264, 266.1, 265.4, 260, 240, 265, 265.8, 265.7

(56) References Cited

U.S. PATENT DOCUMENTS

| | | | | |
|---|---|---|---|---|
| 4,622,661 | A | * 11/1986 | Hoogeveen et al. | ........ 369/280 |
| 5,495,375 | A | * 2/1996 | Baasch et al. | ........... 360/266.1 |
| 6,288,867 | B1 | * 9/2001 | Jierapipatanakul et al. | ...... 360/98.08 |
| 6,456,463 | B1 | * 9/2002 | Van Sloun | ................ 360/266.1 |
| 2003/0076633 | A1 | * 4/2003 | Macpherson et al. | .... 360/265.7 |

OTHER PUBLICATIONS

U.S. Appl. No. 60/366,694.*
IBM TDB Nov 1996 US v. 39 No. 11 p. 221–226.*

* cited by examiner

*Primary Examiner*—Julie Anne Watko
(74) *Attorney, Agent, or Firm*—Robert B. Martin; Dillon & Yudell LLP

(57) ABSTRACT

In a hard disk drive, there are provided a head assembly 13 that drives a magnetic head 33 that reads and writes data on a recording disk, and a flange section that extends toward the periphery on the sleeve 21 of a pivot member 20 that supports this head assembly 13 so that it is free to pivot; and planar sections 41A and 41B are formed on the peripheral surface of this flange section in order to adjust the balance of the center of gravity of the head assembly 13.

12 Claims, 8 Drawing Sheets

[Figure 1]
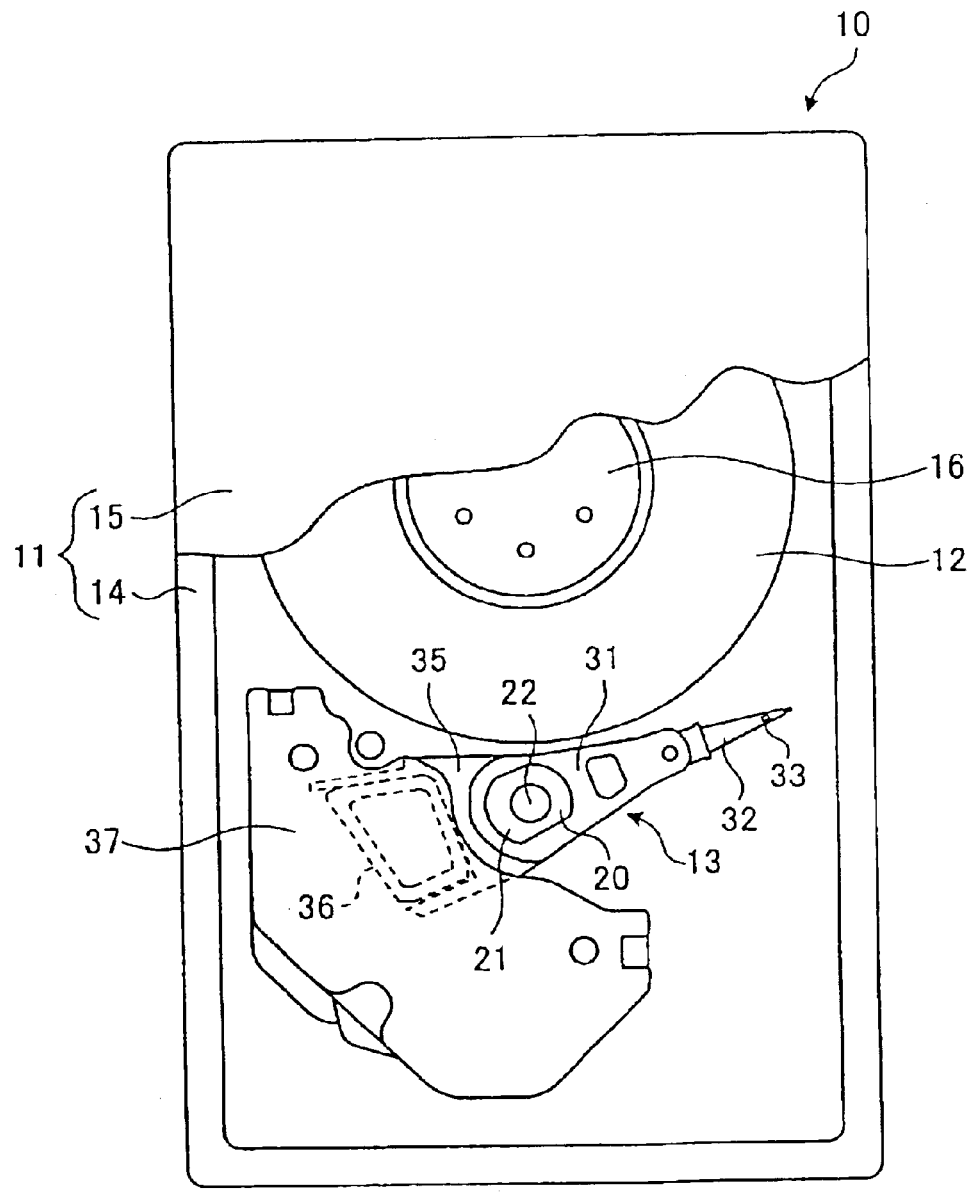

[Figure 2]
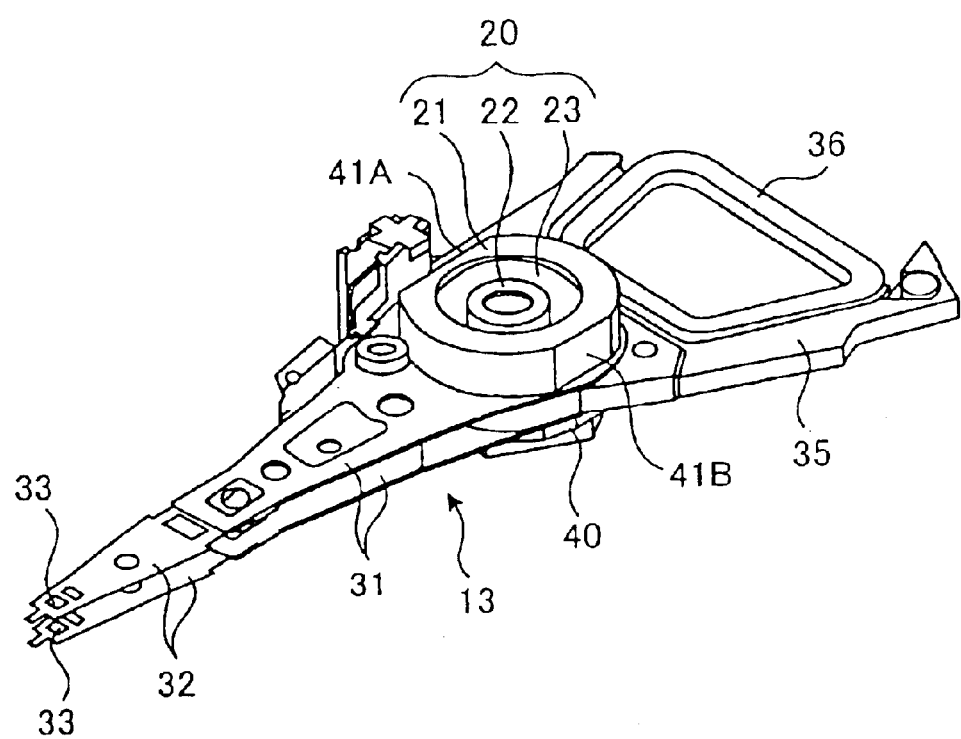

[Figure 4]
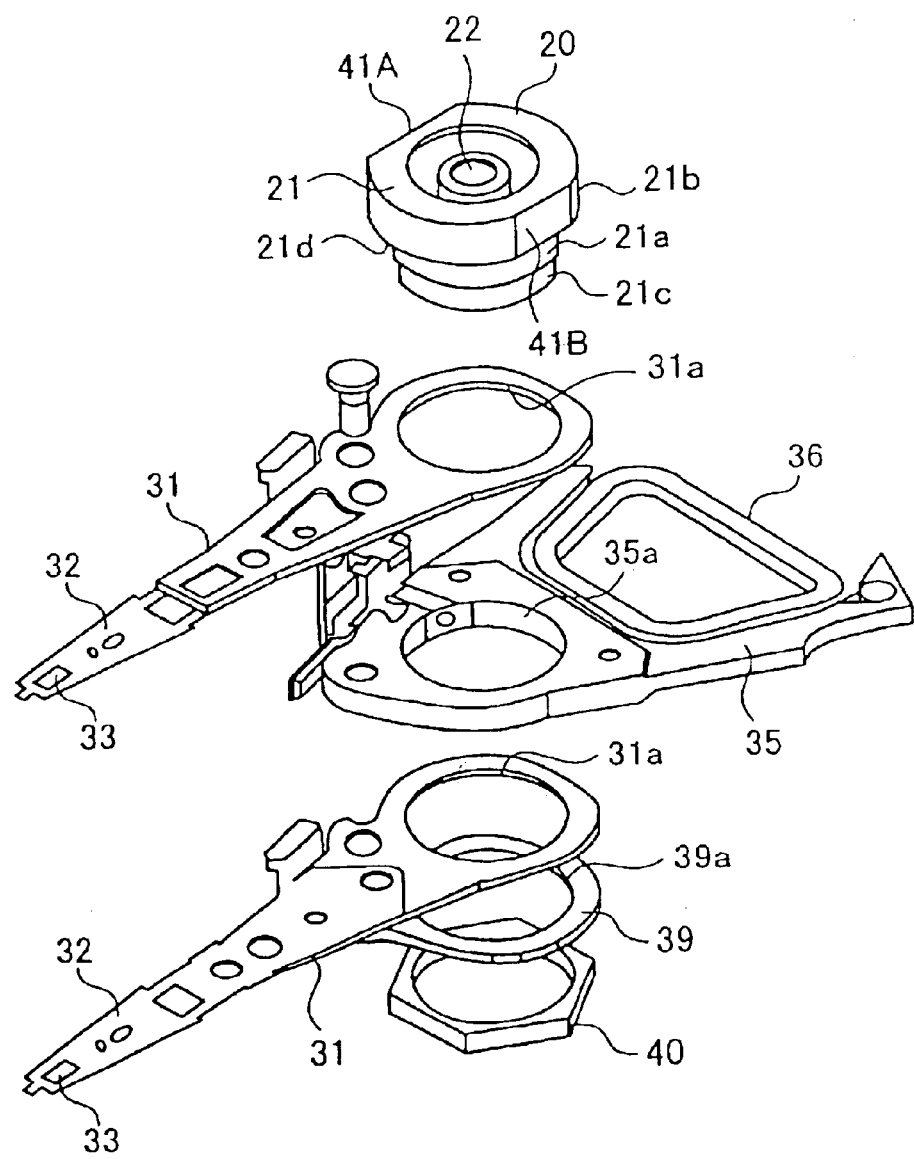

[Figure 5]
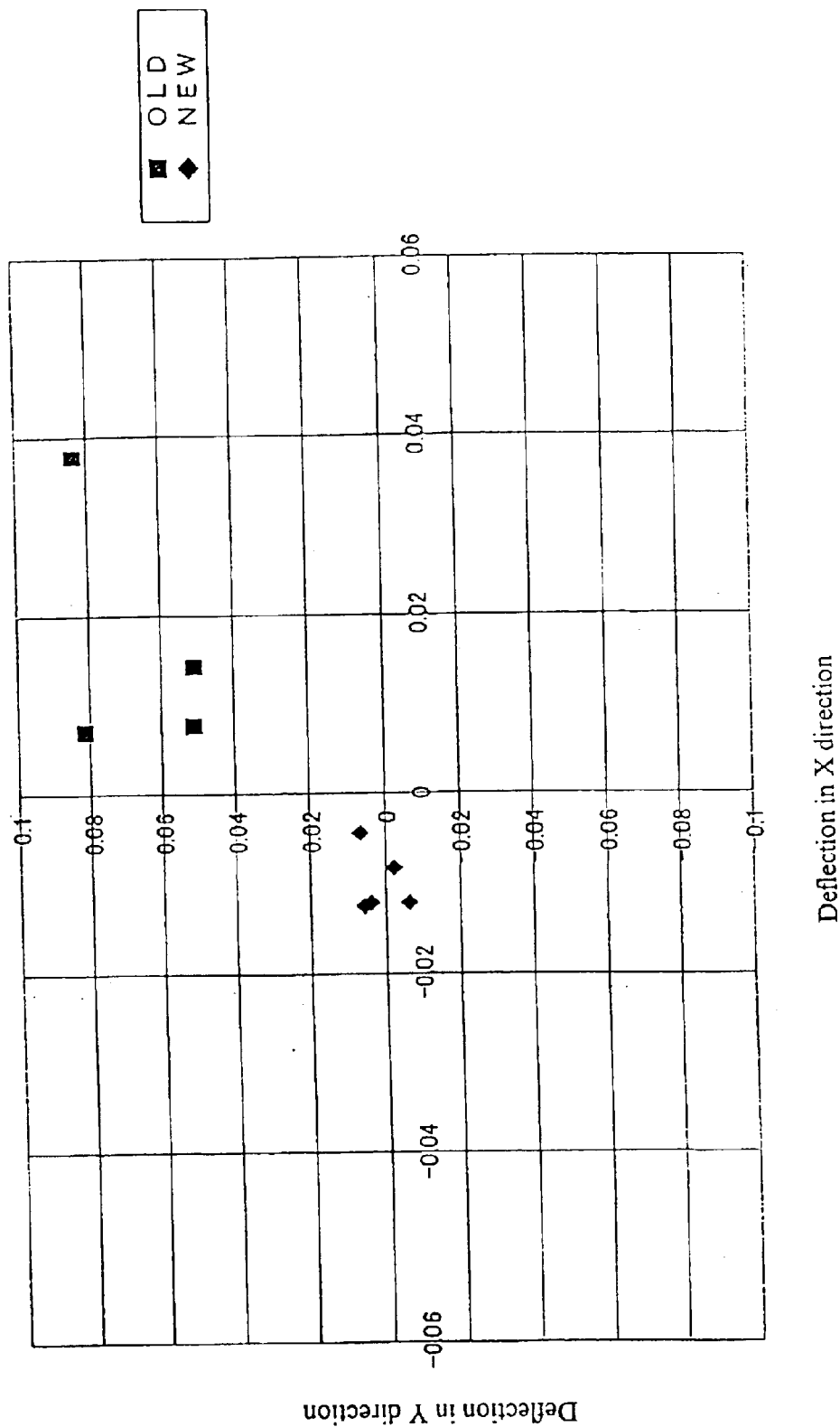

[Figure 6]
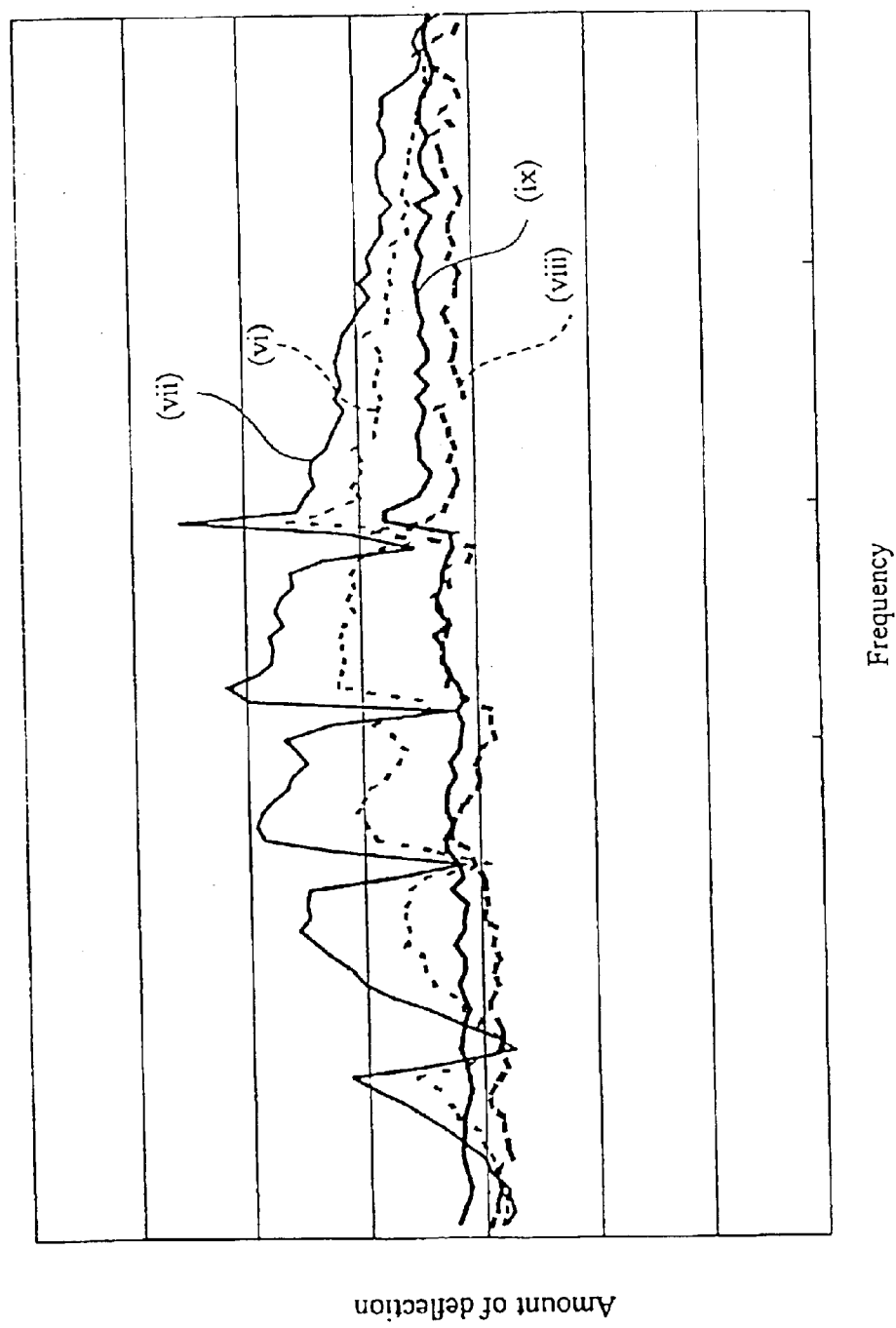

[Figure 7]
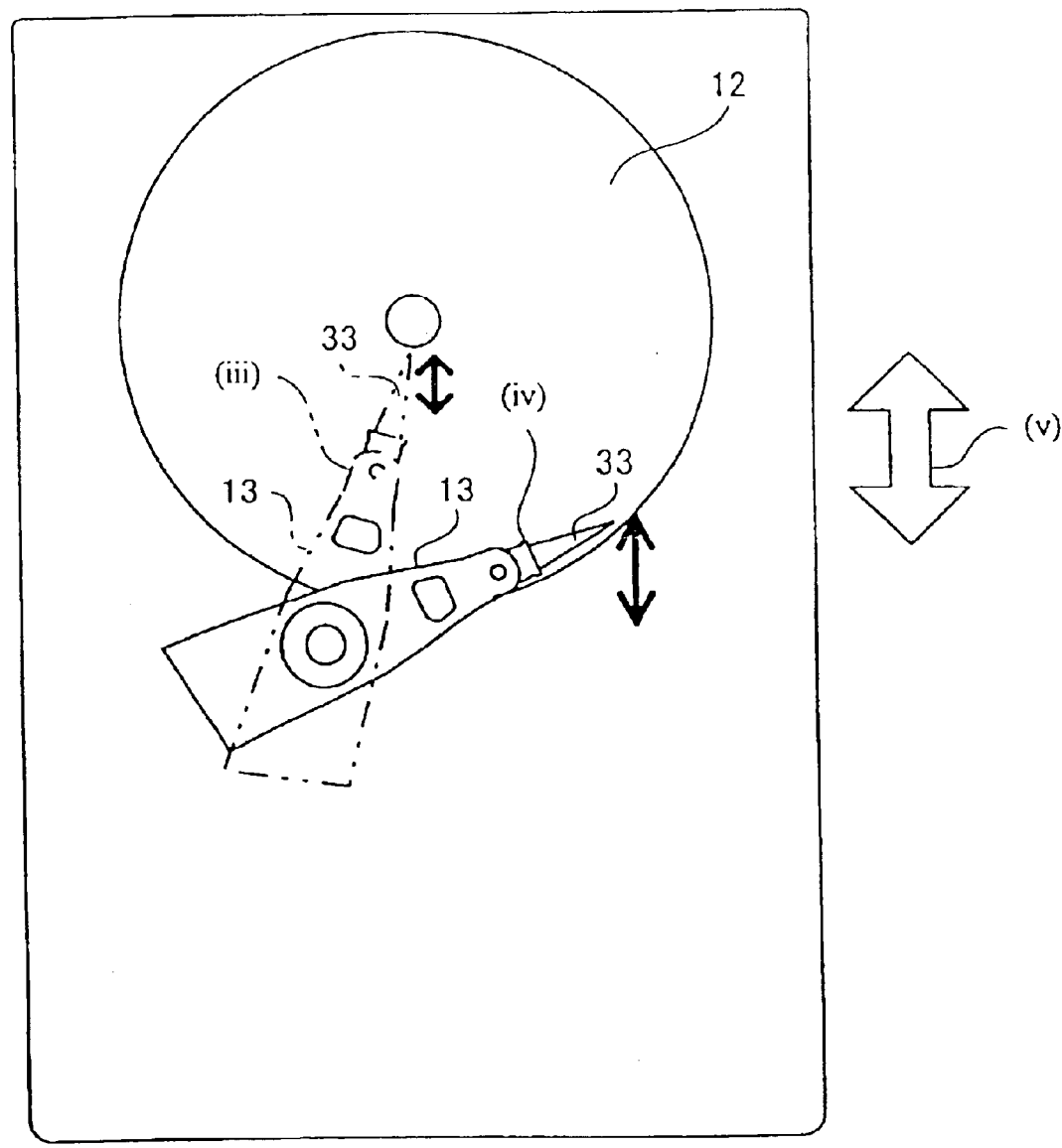

[Figure 8]
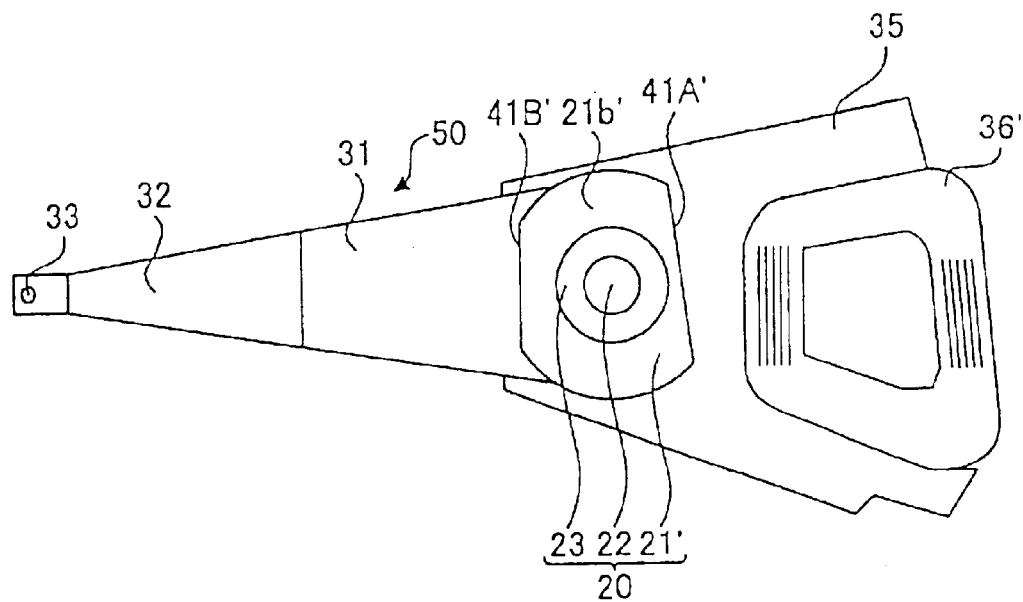
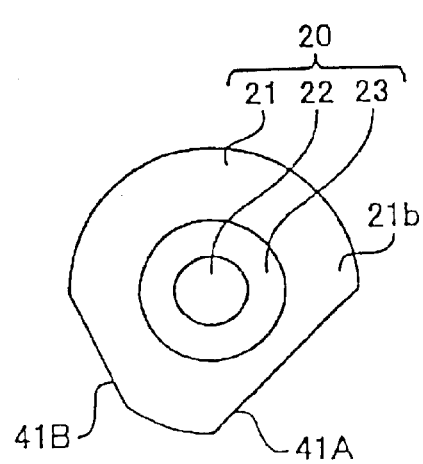
Figure 9A
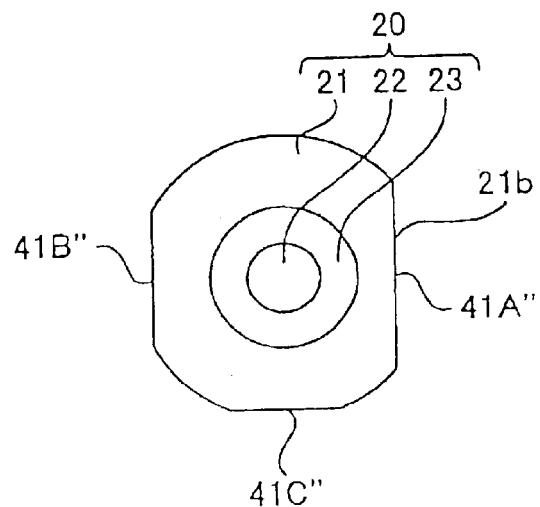
Figure 9B

DISK DRIVE APPARATUS HAVING A PIVOT FOR SUPPORTING A HEAD ASSEMBLY TO ALLOW FREE PIVOTING

This application claims the priority benefit of Japanese Patent Application No. 2001-045715, filed on Feb. 21, 2001, and entitled *"Disk Drive Apparatus, Head Assembly, and Pivot Bearing."*

BACKGROUND OF THE INVENTION

1. Technical Field

The present invention relates to a disk drive apparatus such as a hard disk drive, and relates in particular to a head assembly for performing reading and writing of data on a recording disk, and a head assembly pivot bearing.

2. Description of the Related Art

Disk drive apparatuses such as a hard disk drives are widely used as the main storage destination for data in computer apparatuses. This kind of disk drive apparatus is configured by a recording disk or disks for recording data, accommodated in a housing called a disk enclosure. One or a plurality of recording disks are attached in freely rotatable fashion to a spindle fixed to the housing, and are rotated by a spindle motor. Close to the recording disks is located a head assembly for performing reading and writing of data on the recording disks.

The head assembly is attached so as to be free to pivot to a pivot shaft fixed to the housing of the disk drive apparatus. This head assembly is equipped with an arm that extends on one side with respect to the pivot shaft, and a magnetic head is attached to the end of this arm. A coil support is attached to the opposite side of the arm, enclosing the pivot shaft, and a coil which is a component of a voice coil motor (VCM) for driving this head assembly is held by this coil support.

Located opposite the head assembly coil is a stator which is a component of the VCM, and the head assembly is driven about the pivot shaft by varying the magnetic field generated between the stator and the VCM. As a result, the magnetic head attached to the end of the head assembly arm moves along the surface of a recording disk, and reading of data recorded on a recording disk or writing of data to a recording disk is performed by accessing the target track on the surface of a recording disk.

Now, the storage capacity of disk drive apparatuses has grown remarkably in recent years, and in line with this, the recording density of data on the recording disks has increased. Consequently, the distance between tracks in the radial direction of the recording disks has become smaller, and the trend is one of demand for higher precision for positioning on the tracks on which target data is stored when reading data with a magnetic head.

Also, with the increase in storage capacity, there is a demand for faster reading and writing of data on the recording disks. While it is all very well to perform high-speed processing of data that is read or written with a magnetic head, improving the speed of the mechanical rotation of the head assembly when the magnetic head accesses (seeks) the target track on a recording disk is a major problem.

In speeding up the operation of the head assembly in this way, and moreover improving the precision of magnetic head positioning, the mechanical precision of the head assembly, and more specifically, the location of the center of gravity when the head assembly pivots about the pivot shaft, has a major influence. That is to say, a shift in the location of the center of gravity of the head assembly has greater influence the more the rotational operation of the head assembly is improved. As a result, the positioning precision with respect to the target track decreases, and this may lead to the occurrence of data read/write errors.

For this reason, adjustment of the location of the center of gravity of the head assembly has been carried out heretofore in the design stage or prototype production stage. This involves adjusting the shape of a resin member, etc., that supports a flexible plate provided to transfer signals that are read or written by means of the coil support, arm, and magnetic head comprising the head assembly. More specifically, a depression, etc., is formed in the coil support, arm, resin member, etc., and adjustment is performed so that the location of the center of gravity during pivoting of the head assembly is close to the axis of the pivot shaft.

3. Problems to be Solved by the Invention

However, this kind of head assembly is configured by a plurality of members such as a coil support, arm, VCM coil, magnetic head, and pivot shaft, bearing. Therefore, even if each member is manufactured within predetermined manufacturing tolerances, when these members are assembled to form the head assembly, the accumulation of error within the manufacturing tolerance ranges of the individual members may result in a displacement of the location of the center of gravity of the head assembly.

Also, when forming a depression in the coil support, arm, resin member, etc., comprising the head assembly, for productivity reasons these members are stamped or molded. Consequently, when adding a depression for balance adjustment, or changing its dimensions, modifications must be made to the dies used for forming. Die modifications require a great amount of cost and time, and this also hinders improvement of the product development speed.

Further, since such members, and particularly the coil support, arm, etc., are stamped, it is not possible to control the dimension in the direction of the thickness of the material. Consequently, even if adjustment of the location of the center of gravity of the head assembly is attempted by forming a depression, etc., in these members, it is only possible to adjust the error in the location of the center of gravity by some tens of $\mu$m. Of course, in the prototype production stage, the location of the center of gravity of the head assembly can be adjusted to a higher degree of precision by repeating die modifications while observing these results, but it goes without saying that this involves great increases in cost and time.

The present invention takes account of such technical problems, and its object is to provide a disk drive apparatus, head assembly, and so forth, that enable balance of the head assembly to be achieved with high precision, in an efficient and sure manner.

SUMMARY OF THE INVENTION

The disk drive apparatus of the present invention for achieving the above described objective is characterized in that the head assembly to which the head is attached is fitted to the housing via a pivot member so as to be free to pivot, and the shape of this pivot member in a plane orthogonal to its central axis of pivoting is asymmetrical. By making the pivot member asymmetrical in shape in this way, it is possible to adjust the balance when the head assembly pivots. Such a pivot member can be thought of as having balance adjustment sections. It is desirable for these balance adjustment sections to be formed on a part of the pivot member with the greatest outer diameter: for example, a flange section formed at one end of the pivot member. As a result, the balance adjustment sections are formed at the part where the degree of contribution to balance adjustment is greatest within the pivot member.

Now, such a disk drive apparatus is not limited to a so-called hard disk drive, but may also be of another type. Also, the disk-shaped medium need not be built into the disk drive apparatus, but may also be of a type where data reading and writing is performed by pivoting a head assembly with respect to an insertable and removable disk-shaped medium. Moreover, the head may perform either or both reading and/or writing of data on the disk-shaped medium.

In the disk drive apparatus of the present invention, a pivot member supporting a head assembly so that it is able to pivot has a shaft fixed on the base side, a sleeve fixed on the head assembly side, and a bearing mounted between the shaft and the sleeve (positioned so as to be held between the shaft and the sleeve), and the sleeve has a flange section on which are formed balance adjustment sections that adjust the balance when the head assembly pivots. As a result of the formation of these balance adjustment sections, the shape of the sleeve in a plane orthogonal to the shaft may be asymmetrical, but may also be symmetrical in shape.

These balance adjustment sections may also be planar sections formed on the peripheral surface of the flange section. Such planar sections can easily be formed by machining the flange section in the working process. Also, planar sections can be formed at least two places on the flange section, and can be used when positioning the sleeve in the pivot member assembly process. As a result, only the processing dimensions vary when forming the planar sections, and there is no increase in working processes.

To consider the present invention as a head assembly, it can also be characterized in that a pivot member that supports this head assembly so that it is able to pivot, a first arm to which the head is attached and that extends from the pivot member on one side, and a second arm having a voice coil motor and that extends from said pivot member on another side, are provided; and with regard to the sleeve that is a component of the pivot member, the location of the center of gravity in a plane orthogonal to the axis of the shaft is eccentric with respect to the axis of the shaft. By means of such a configuration, also, it is possible to adjust the location of the center of gravity when the head assembly pivots. Also, this head assembly may also be of a so-called stacked type, in which a first arm and second arm that have holes with an inner diameter corresponding to the outer diameter of the sleeve, respectively, are mounted in stacked fashion by inserting the sleeve into the above described holes.

The present invention can also be considered as a pivot bearing for supporting a head assembly so that it is able to pivot, and can be characterized in that the sleeve that is a component of this pivot bearing has a flange section that extends toward the periphery at one end, and on the flange section is formed a depression located inward from the maximum diameter section of that flange section on that peripheral surface. As long as the depression is located inward from the maximum diameter section of the flange section, its shape is not limited in any way, and it can also be formed by a planar section. If the planar section is a machined surface, the processing, and the dimensions of the planar section with respect to the maximum diameter section, can be changed easily.

BRIEF DESCRIPTION OF THE DRAWINGS

FIG. 1 is a drawing showing the configuration of a hard disk drive according to this embodiment, and showing the internal configuration with part of the cover of the disk enclosure cut away;

FIG. 2 is a drawing showing an oblique view of the configuration of the head assembly;

FIG. 4 is a drawing showing the members that configure the head assembly;

FIG. 5 is a drawing for comparing the location of the center of gravity after adjustment for a head assembly according to this embodiment and a conventional head assembly;

FIG. 6 is a drawing showing the difference in the occurrence of deflection at the outer edge (periphery) and inner edge of a recording disk for a head assembly according to this embodiment and a conventional head assembly;

FIG. 7 is a drawing showing the head assembly positioned at the outer edge (periphery) and inner edge of a recording disk;

FIG. 8 is a drawing showing an example of another head assembly; and

FIGS. 9A and 9B are drawing each showing an example of another pivot member.

DETAILED DESCRIPTION OF THE PREFERRED EMBODIMENT

Figure 3A:
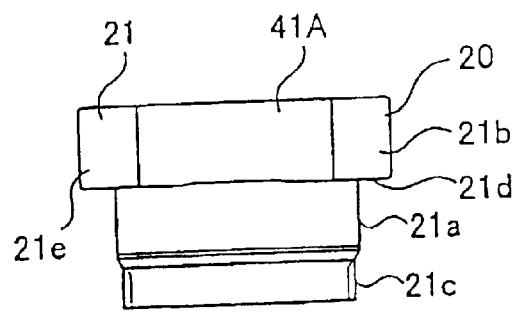
FIG. 3A is a drawing of the front view of the pivot member.

The present invention will now be described in detail based on the embodiments shown in the attached drawings. FIG. 1 shows a hard disk drive (disk drive apparatus) 10. This hard disk drive 10 is built into or externally connected to a PC (Personal Computer) (not shown), and performs data read and write operations, etc., on the basis of instructions from this PC constituting the host.

The hard disk drive 10 is equipped with a predetermined number of recording disks (disk-shaped media, data storage media) 12 and a head assembly 13 inside a disk enclosure (housing) 11. The disk enclosure 11 is configured by a base 14, shaped like a box with a bottom and open at the top, and a cover 15 that covers the opening of this base 14. The recording disks 12 are, for example, nonvolatile storage media such as magnetic disks, and are set on a spindle 16 fitted to the base 14. When a plurality of recording disks 12 are provided, a predetermined number of recording disks 12 are stacked on the spindle 16. The spindle 16 is integral with a spindle motor (disk drive source: not shown) of hub-in construction, and the recording disks 12 can be rotated by means of this spindle motor at a predetermined rotation speed about the axis of the spindle 16.

As shown in FIG. 2, the head assembly 13 has a pivot member (pivot bearing) 20 in its middle section. As shown in FIG. 2 and FIG. 3, the pivot member 20 is configured by a tubular sleeve 21 constituting its periphery, a shaft (central axis of pivoting) 22 of a predetermined length and one end of which is fixed to the base 14 shown in FIG. 1, and a bearing 23 located between the inner surface of this sleeve 21 and the outer surface of the shaft 22. The configuration is such that the sleeve 21 is supported by this bearing 23 so as to be able to rotate about the axis of the shaft 22, one end of which is fixed to the base 14, and the head assembly 13 can pivot about the pivot member 20 in a plane along the rear surface of the recording disks 12.

As shown in FIG. 2, the head assembly 13 is configured such that arms (first arms) 31 extend on one side of the pivot member 20 and suspension arms 32 are attached to the end of arms 31, and magnetic heads (heads) 33 are attached to these suspension arms 32. Two magnetic heads 33 are provided, an upper and a lower, for each of the recording disks 12 provided in the hard disk drive. This head assembly 13 is also equipped with an approximately U-shaped or V-shaped coil support arm (second arm) 35 that extends on the opposite side from arms 31, enclosing the pivot member 20. This pair of coil support arms 35 supports a coil (voice coil motor coil) 36 that has a predetermined number of windings.

Meanwhile, opposite the coil 36 of the head assembly 13, a stator 37 for generating a magnetic field between itself and the coil 36 is fixed to the base 14. By means of this coil 36 and stator 37, a VCM is configured as a drive source for pivoting the head assembly 13 about the pivot member 20. By controlling the flow of electricity to the coil 36, the magnetic field generated between the stator 37 and coil 36 is varied, and the head assembly 13 pivots accordingly. As a result, a magnetic head 33 attached to the ends of an arm 31 of the head assembly 13 accesses a position opposite the target track on a recording disk 12 by moving approximately radially across the rear surface of the recording disk 12, and reading of data recorded on the recording disk 12 or writing of data to the recording disk 12 is performed.

In this embodiment, a structure is used for the head assembly 13 whereby a predetermined number of arms 31 are attached to the pivot member 20 in stacked fashion. That is to say, as shown in FIG. 4, the arms 31 and coil support arm 35 that are components of the head assembly 13 are stacked alternately on part of the pivot member 20, and by inserting a coil support arm 35 and spacer 39 between the predetermined number of arms 31, the interval between the arms 31 located above and below each recording disk 12 (see FIG. 1) is of a predetermined dimension. Apertures (holes) 31a, 35a, and 39a with a predetermined inner diameter are formed, respectively, in these arms 31, coil support arm 35, and spacer 39.

Meanwhile, the middle section in the lengthwise direction 21a of sleeve 21 of the pivot member 20 has an outer diameter corresponding to the inner diameter of apertures 31a, 35a, and 39a. Also, as shown in FIG. 3A, a flange section 21b with an outer diameter greater than that of the middle section 21a is formed at one end of the length of the middle section 21a of the sleeve 21, and a thread groove 21c is formed in the peripheral surface at the other end. Thus, a surface 21d projecting toward the periphery and orthogonally to the peripheral surface of the middle section 21a is formed between the middle section 21a and the flange section 21b.

With regard to this sleeve 21, by screwing a fixing nut 40 onto the thread groove 21c with the middle section 21a inserted into the apertures 31a, 35a, and 39a of the arms 31, coil support arm 35, and spacer 39, these arms 31, coil support arm 35, and spacer 39 are held gripped between surface 21d and the fixing nut 40.

Figure 3B:
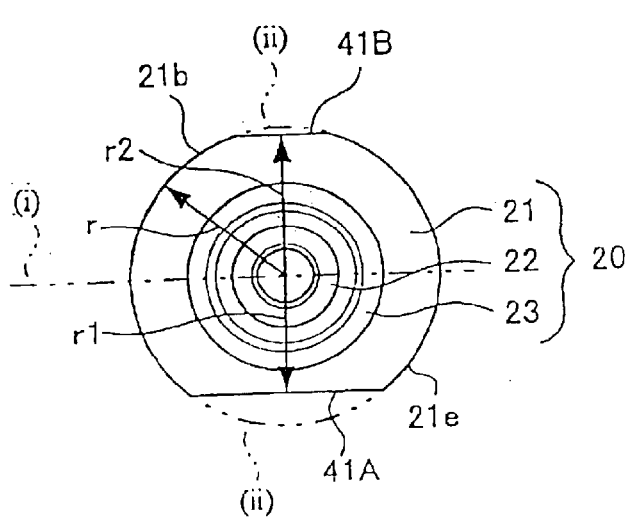
FIG. 3B is a drawing of the plan view of FIG. 3A.
Figure 3C:
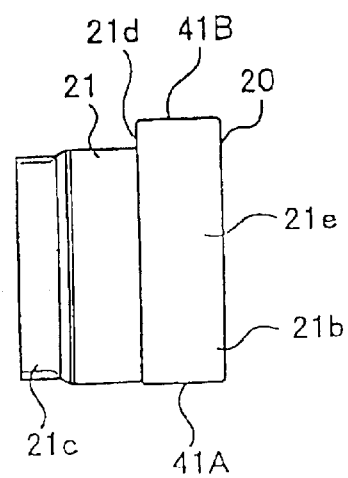
FIG. 3C is a drawing of the side view of FIG. 3B.

Now, as shown in FIG. 3B, in a head assembly 13 with such configuration, the outer shape of this flange section 21b of the sleeve 21 which is a component of the pivot member 20 is not perfectly circular, but two planar sections 41A and 41B are formed as balance adjustment sections on its peripheral surface 21e. The two planar sections 41A and 41B are parallel to each other, and parallel to the axis of the shaft 22. As a result, the flange section 21b has an asymmetrical shape with respect to an arbitrary line (such as denoted, for example, by reference numeral (i) in FIG. 3B) passing through the shaft 22 between the planar sections 41A and 41B. In other words, with reference to the shaft 22, dimension r1 up to planar section 41A and dimension r2 up to planar section 41B are different.

These planar sections 41A and 41B are for adjusting the balance of the center of gravity when the head assembly 13 pivots about the shaft 22 of the head assembly 13. Therefore, the dimension r of the maximum diameter section of the flange section 21b (the section where the outer diameter of the pivot member 20 is greatest), dimension r1 up to planar section 41A with reference to the shaft 22, and dimension r2 up to planar section 41B with reference to the shaft 22, are determined on the basis of the location of the center of gravity of the entire head assembly 13 when pivoting about the shaft 22. That is to say, dimensions r1 and r2 that should cause the location of the center of gravity when the head assembly 13 pivots to coincide with the location of the axis of the shaft 22, are determined. These dimensions r1 and r2 can be calculated using CAD (computer-aided design) in the design stage so that the location of the center of gravity of pivoting of the head assembly 13 coincides with the location of the axis of the shaft 22. Also, in the prototype production stage, it is possible to assemble an actual prototype of the head assembly 13, measure the location of its center of gravity of pivoting, and determine dimensions r1 and r2 on the basis of the amount of displacement from the location of the axis of the shaft 22.

These planar sections 41A and 41B are machined surfaces, and when the flange section 21b is formed in the working process in the manufacture of the sleeve 21, are formed by executing machining by means of a machine tool such as a milling machine, with the periphery circular in shape, shown by the two-dot chain line denoted by reference numeral (ii) in FIG. 3B.

Also, in the assembly processing in the manufacture of the head assembly 13, these planar sections 41A and 41B are used for positioning and supporting so that the sleeve 21 does not rotate when the arms 31, coil support arm 35, and spacer 39 are set by being dropped from above with the flange section 21b of the sleeve 21 positioned below (the vertical reverse of the state shown in FIG. 3k). To be more precise, a depression with a shape corresponding to the flange section 21b that has planar sections 41A and 41B is formed on the side of the apparatus (not shown) holding the sleeve 21, and the flange section 21b of the sleeve 21 is fitted into this depression, or planar sections 41A and 41B are held by being gripped from both sides with a chuck member that can be opened and closed.

According to the above described configuration, in a hard disk drive, a head assembly 13 that drives a magnetic head 33 that reads and writes data on a recording disk 12 is so configured that a flange section 21b extending toward the periphery is provided on the sleeve 21 of a pivot member 20 that supports this head assembly 13 so as to be free to pivot, and planar sections 41A and 41B for adjusting the balance of the center of gravity of the head assembly 13 are formed on this flange section 21b. With regard to these planar sections 41A and 41B, dimensions r1 and r2 are determined that should cause the location of the center of gravity when the head assembly 13 pivots to coincide with the location of the axis of the shaft 22, and as a result, the flange section 21b is asymmetrical in shape. By this means it is possible to achieve balance of the head assembly 13, and highly precise positioning with respect to a recording disk 12 of the magnetic head 33 is possible even when the head assembly 13 is pivoted at high speed.

At this time, since the planar sections 41A and 41B are formed by machining with a machine tool, the location of the center of gravity of the head assembly 13 can be adjusted in units of several tens of μm simply by varying dimensions r1 and r2—that is, the amount of machining—and the balance of the head assembly 13 can be adjusted easily and with high precision. Also, in the prototype production stage, even if displacement of the location of the center of gravity of the head assembly 13 occurs due to an accumulation of manufacturing error for individual members when the members configuring the head assembly 13 are assembled, the balance of the head assembly 13 can easily be corrected at this point. Therefore, compared with the situation heretofore in which the die had to be modified, adjustment of the balance of the head assembly 13 can be performed speedily and at low cost, and the speed of product development can be improved.

In addition, since the planar sections 41A and 41B are formed on the peripheral surface 21e of the flange section 21b of the sleeve 21, processing is also easy, and since the position is further toward the periphery than with a method whereby balance is achieved by executing processing on the shaft 22 or the middle section 21a of the sleeve 21, for example, the degree of contribution to the moment of inertia when the head assembly 13 pivots is greater, and the degree of adjustment is also larger.

Also, these planar sections 41A and 41B are used, originally, for positioning and supporting so that the sleeve 21 does not rotate in the assembly process during manufacture of the head assembly 13. Therefore, it is sufficient simply to change dimensions r1 and r2, without specially adding a sleeve 21 working process, making it possible to avoid an increase in the workload or cost involved in sleeve 21 processing.

Now, the head assembly 13 employs a structure whereby a predetermined number of arms 31 are stacked, and is configured so as to allow the number of arms 31 to be installed to be changed as appropriate according to the number of recording disks 12. With such a configuration, also, balance adjustment of the head assembly 13 can be performed simply by changing dimensions r1 and r2 of the planar sections 41A and 41B.

FIG. 5 shows a graph in which the location of the center of gravity has been measured for a head assembly 13 with the above described configuration (denoted by "NEW" in FIG. 5) and for a head assembly for which balance adjustment was performed with the conventional method (denoted by "OLD" in FIG. 5). As shown in FIG. 5, a plurality of measurements were taken for both head assembly 13 and the conventional head assembly, and whereas there is a displacement of the location of the center of gravity of 0.05 mm or more with the conventional head assembly (origin: axis of the shaft 22), displacement is kept within about 0.01 mm in the case of head assembly 13 with the above described configuration.

Moreover, FIG. 6 shows the results of measuring the deflection of head assembly 13 on the magnetic head 33 side when a unidirectional excitation test was performed for a hard disk drive incorporating a head assembly 13 with the above described configuration and a hard disk drive incorporating a head assembly for which balance adjustment was performed with the conventional method. Deflection was measured when vibration was applied in the direction shown by the arrows in FIG. 7, with the tip of the head assembly positioned at the inner edge of the recording disk 12 (denoted by reference numeral (iii) in FIG. 7), and positioned at the outer edge (periphery) (denoted by reference numeral (iv) in FIG. 7). As can be seen from FIG. 6, with the conventional head assembly, since the precision of balance adjustment of the location of the center of gravity is low, the moment of inertia corresponding to the direction of excitation (denoted by reference numeral (v) in FIG. 7) differs between the case where the head assembly is positioned at the inner edge of the recording disk 12 (denoted by reference numeral (vi) in FIG. 6) and the case where it is positioned at the outer edge (periphery) (denoted by reference numeral (vii) in FIG. 6), and consequently the amount of deflection differs. That is to say, with a track at the periphery of the recording disk 12 there is a tendency for the precision of positioning of the magnetic head to fall when vibration is applied. In contrast to this, with a head assembly 13 with the above described configuration, the difference in the amount of deflection between the case where the head assembly 13 is positioned at the inner edge of the recording disk 12 (denoted by reference numeral (viii) in FIG. 6) and the case where it is positioned at the outer edge (periphery) (denoted by reference numeral (ix) in FIG. 6) is small, and moreover the actual absolute value of the amount of deflection is much smaller.

FIG. 8 shows a different embodiment from that described above. With the head assembly 50 shown in FIG. 8, the number of windings of the coil (voice coil motor coil) 36' is greater than in the case of the coil 36 of the head assembly 13 shown in FIG. 2, and consequently the weight of coil 36' is also greater. Thus planar sections (balance adjustment sections, machined surfaces) 41A' and 41B' are formed on the flange section 21b' of the sleeve 21' so as to allow for the increase in weight of this coil 36' and to allow the location of the center of gravity of the head assembly 50 when pivoting to coincide with the axis of the shaft 22. As a result, with the increase in weight of the coil 36', planar section 41 A' is positioned toward the side opposite the coil 36'.

Such a head assembly 50, as with the head assembly 13 shown in FIG. 2, is configured so as to be incorporated in the hard disk drive shown in FIG. 1. According to this configuration, with the greater number of windings of the coil 36', the balance of the head assembly 50 can be achieved with high precision, so that, in addition to the same kind of effects as in the case of the head assembly 13 shown in FIG. 2, the driving torque of the VCM can be increased, and as a result, the pivoting speed of the head assembly 50 can be improved, and the access time to the target track shortened.

In the above described embodiments, the configuration is such that the flange section 21b/21b' is provided with mutually parallel planar sections 41A and 41B/41A' and 41B', but this is not a limitation, and a configuration is also possible whereby these planar sections 41A and 41B (or 41A' and 41B') are positioned in plane at a predetermined angle to each other, as shown in FIG. 9A. Also, the configuration is such that two planar sections 41A and 41B (41A' and 41 B') are provided on the flange section 21b (21b'), but this is not a limitation, and a configuration is also possible whereby three planar sections (balance adjustment sections, machined surfaces) 41A", 41B", and 41C", or four or more planar sections, are provided, as shown in FIG. 9B.

In addition, it is also possible for the planar sections 41A and 41B/41A' and 41B' not to be formed across the entire thickness of the flange section 21b/21b', but on only a part thereof—that is, to have a stepped shape—and it is also possible for the planar sections 41A and 41B/41A' and 41B' to be formed not parallel to, but at an angle to, the axis of the shaft 22.

Also, the actual structure of the head assembly 13/50 in the above described embodiments is only one example, and as long as balance adjustment is achieved by forming planar sections 41A and 41B on the sleeve 21 of the pivot member 20, the other parts can be of any configuration.

Moreover, in the above described embodiments, the head assembly 13/50 of a hard disk drive is used as an example, but a hard disk drive also includes a unit can that be inserted into and removed from a PC, as with a Microdrive (registered trademark of IBM Corporation of the U.S.A.), for example. Additionally, as long as a head assembly is provided that pivots with respect to a recording disk, the configuration of the disk drive apparatus itself is not limited in any way to the configurations of the above described embodiments.

Moreover, while embodiments of the present invention have been described above, the present invention is not limited to these, and various modifications are possible without departing from the object of the present invention.

What is claimed is:

1. A disk drive apparatus, comprising:
   a disk drive source that drives a disk-shaped medium that stores data;
   a head assembly to which is attached a head for reading data from and writing on the disk medium;
   a housing that accommodates the disk drive source and the head assembly; wherein
   the head assembly is attached to the housing via a pivot member so as to be able to pivot; and wherein
   the shape of the pivot member in a plane orthogonal to its central axis of rotation is asymmetrical.

2. The disk drive apparatus of claim 1, wherein the pivot member has an asymmetrical shape due to balance adjustment sections that adjust a balance when the head assembly pivots are formed.

3. The disk drive apparatus of claim 2, wherein the balance adjustment sections are formed at a part where an outer diameter of the pivot member is greatest.

4. A disk drive apparatus, comprising:
   a disk enclosure having a box-shaped base with an aperture and a cover that seals the aperture;
   a recording disk that stores data and is rotated by a spindle motor; a head assembly having a head for reading data from and writing data on the recording disk and that causes that head to seek on the recording disk by pivoting about a pivot member; wherein
   the pivot member has a shaft fixed on the base side, a sleeve fixed on the head assembly side, and a bearing mounted between the shaft and the sleeve; and wherein
   the sleeve has a flange section that extends toward the periphery, and balance adjustment sections that adjust the balance when the head assembly pivots are formed on that flange section.

5. The disk drive apparatus of claim 4, wherein the balance adjustment sections are planar sections formed on the peripheral surface of the flange section.

6. The disk drive apparatus of claim 5, wherein the planar sections are formed in at least two places on the flange section, and are used when positioning the sleeve in an assembly process of the pivot member.

7. A head assembly that moves over a data storage medium by pivoting, comprising:
   a pivot member that supports the head assembly so as to be free to pivot with respect to a base on which the head assembly is mounted;
   a first arm that extends from the pivot member on one side;
   a head that is attached to the first arm and that reads data from and writes data on the data storage medium;
   a second arm that extends from the pivot member on another side; a voice coil motor coil
   supported by the second arm; wherein
   the pivot member has a shaft fixed on the base side, a sleeve fixed on the head assembly side, and a bearing mounted between the shaft and the sleeve; and wherein
   the sleeve has a flange section at one end, and with regard to the flange section, the location of a center of gravity of a flange section in a plane orthogonal to the axis of the shaft is eccentric with respect to the axis of the shaft.

8. The head assembly of claim 7, wherein the shape of the flange section in the plane orthogonal to the axis of the shaft is asymmetrical.

9. The head assembly of claim 7, wherein planar sections located inward from the maximum diameter section of the flange section are formed as balance adjustment sections on the peripheral surface of that flange section.

10. The head assembly of claim 7, wherein the first arm and the second arm respectively have a hole that has an inner diameter corresponding to the outer diameter of the sleeve, and a predetermined number of the first arms and the second arms are attached in a stacked fashion by inserting the sleeves into the holes respectively.

11. A pivot bearing for supporting a head assembly that moves over a data storage medium so as to be able to pivot, comprising:
   a tubular sleeve fixed on the head assembly side;
   a shaft placed within the sleeve;
   a bearing located between the sleeve and the shaft; and wherein
   the sleeve has at one end a flange section extending toward the periphery and asymmetrical in shape in a plane orthogonal to a central axis of rotation of the shaft, and on that flange section a depression is formed located inward from the maximum diameter section of that flange section.

12. The pivot bearing of claim 11, wherein the depression is formed by a planar section located inward from the maximum diameter section of the flange section, and the planar section is a machined surface.

\* \* \* \* \*

UNITED STATES PATENT AND TRADEMARK OFFICE
CERTIFICATE OF CORRECTION

PATENT NO. : 6,940,699 B2  
APPLICATION NO. : 10/061990  
DATED : September 6, 2005  
INVENTOR(S) : Yuld et al.

Page 1 of 1

It is certified that error appears in the above-identified patent and that said Letters Patent is hereby corrected as shown below:

At column 6, line 41, delete "3$k$" and insert --3B--.

Signed and Sealed this

Twelfth Day of September, 2006

JON W. DUDAS  
*Director of the United States Patent and Trademark Office*